Patented Oct. 29, 1946

2,410,070

UNITED STATES PATENT OFFICE 2,410,070

CATALYTIC ALKYLATION PROCESS

Aaron W. Horton, Detroit, Mich., assignor to Socony-Vacuum Oil Company, Incorporated, a corporation of New York No Drawing. Application December 8, 1943, Serial No. 513,461

16 Claims. (Cl. 260—683.4)

This invention relates to the alkylation of paraffinic hydrocarbons with olefinic hydrocarbons and is more particularly concerned with the production of high octane motor fuel by the catalytic alkylation of paraffinic hydrocarbons with olefinic hydrocarbons.

It is well known in the art to polymerize olefinic hydrocarbon gases to produce motor fuels having constituents of an unsaturated character. Various commercial processes have been proposed for ultimately effecting the desired polymerization of the olefinic hydrocarbons. These processes have been predicated upon the dictates of the chemical nature of the stocks available as well as engineering considerations such as initial and operation costs; their essential feature being that in the course of treating the materials, the olefinic hydrocarbons produced in the earlier stages of the process, are eventually polymerized to gasoline. Accordingly, hydrocarbon gases may be passed along with cracking stock or naphtha through a cracking still to crack and polymerize such gases to gasoline simultaneously with the cracking or reforming, or paraffinic hydrocarbon gases may be separately cracked to olefinic hydrocarbon gases and these gases are subsequently passed with naphtha through a polymerizing and reforming still. In some instances, the processes involve the use of catalysts for facilitating the cracking and/or polymerization operations.

It is also well known in the art, to combine paraffinic hydrocarbons directly with olefinic hydrocarbons by processes broadly called alkylation processes, to produce motor fuels having constituents of saturated character. In alkylation processes, a charge comprising a mixture of a paraffinic hydrocarbon, called the paraffinic reactant, and an olefinic hydrocarbon, called the olefinic reactant, is subjected to high temperature and pressure to produce a saturated alkylate product. Since conditions of alkylation also cause polymerization of the olefinic reactant, it is necessary to maintain a relatively low concentration of the olefinic reactant in the charge. The only limit to the pressure used appears to be the feasibility of maintaining high pressures. On the other hand, the temperature used is limited by degradation of the hydrocarbon reactants in the charge to low molecular weight hydrocarbons, and the occurrence of side reactions, including polymerization of the olefinic reactant, under high temperature conditions, that substantially reduce the purity of the product obtained.

Alkylation may be conducted at high temperatures and pressures, of the order of over 900° F. and over 4000 pounds per square inch gauge, respectively, or may be conducted in the presence of alkylation catalysts, at lower temperatures and pressures, thereby assuring a high yield of desired alkylate by avoiding extensive degradation of the reactants, the occurrence of side and secondary reactants, and appreciable polymerization of the olefinic reactant. The two methods are known as thermal alkylation and as catalytic alkylation, respectively.

Several methods are known for the catalytic alkylation of isoparaffinic hydrocarbons with olefinic hydrocarbons. For instance, it is known to alkylate isoparaffinic hydrocarbons with olefinic hydrocarbons in the presence of sulfuric acid, phosphoric acid, metal phosphates, metal halides, activated clays and the like, as catalysts. In these catalytic alkylation processes, the hydrocarbon reactants form with the alkylation catalysts, a heterogeneous system, during the alkylation operation. Hence these alkylation catalysts may be termed heterogeneous alkylation catalysts. Since under alkylation conditions, the catalytic activity of the alkylation catalysts appears to be predicated upon contact between the catalysts and the gaseous hydrocarbon reactants at the interfaces therebetween, in these processes, the catalysts are used in amounts varying between 10% and 200% by weight, on the charge, depending on the catalyst used. Due to these comparatively high amounts, where possible, recovery and regeneration of the catalysts have been proposed. This, of course, involves high initial and operation costs. Further, it is also known that certain substances called promoters, promote the catalytic action of these alkylation catalysts. Accordingly, several processes have been proposed wherein small amounts of these promoters, on the order of about 1% to 3% by weight of the charge, are added to the catalysts to promote their alkylation catalytic activity.

A copending application, Serial Number 502,018, filed September 11, 1943, is directed to the process of alkylating normal paraffinic and isoparaffinic hydrocarbons with olefinic hydrocarbons, which comprises contacting a normal paraffinic or isoparaffinic hydrocarbon and an olefinic hydrocarbon in a reaction zone under alkylating conditions, with small or promoter amounts of what has been termed therein, a homogeneous gaseous phase alkylation catalyst consisting essentially of a material that forms with the hydrocarbon reactants, a single homogeneous gaseous phase under the alkylation conditions of the reaction zone. The alkylation conditions of the process of this copending application, comprise a broad temperature range of about 590° F. to about 850° F., preferably, about 650° F. to about 825° F., and pressures of at least 500 pounds per square inch gauge, preferably, pressures of at least 1500 pounds per square inch.

Another copending application, Serial Number 502,813, filed September 17, 1943, in which the inventor of the present application is coinventor, is directed to the process of alkylating isobutane with propylene, which comprises contacting isobutane with propylene in a reaction zone under closely controlled alkylating conditions, with promoter or small amounts of the homogeneous gaseous phase catalysts broadly disclosed in the copending application referred to hereinbefore, the closely controlled alkylating conditions including a temperature range of about 750° F. to about 850° F., preferably, about 775° F. to about 825° F., and pressures of at least 2500 pounds per square inch gauge. In the alkylation of isobutane with propylene in the presence of homogeneous gaseous phase alkylation catalysts, it was found that the alkylate obtained included constituents that are entirely different from the constituents of the hydrocarbon alkylate obtained in the alkylation of isobutane with propylene in the presence of known heterogeneous alkylation catalysts, i. e., AlCl₃, H₂SO₄, and the like. Thus, when heterogeneous alkylation catalysts are used, 2,3-dimethylpentane and 2,4-dimethylpentane are important constituents of the hydrocarbon alkylate obtained. On the other hand, when homogeneous gaseous phase alkylation catalysts are employed, triptane, or 2,2,3-trimethylbutane, 2,2-dimethylpentane, and 2-methylhexane may be the predominant constituents of the hydrocarbon alkylate. In this copending application, the formation of these three compounds was postulated as follows:

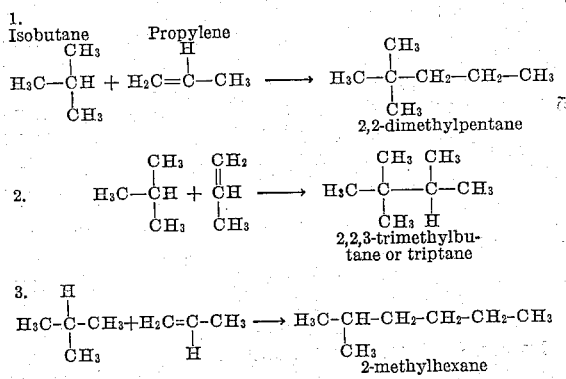

From a motor fuel standpoint, the 2,2-dimethylpentane produced by the first reaction, has an octane number of about 80 CFR motor method; the triptane produced by the second reaction has an octane number of well over 100, and the 2-methylhexane obtained in the third reaction has an octane number of about 45. In view of the foregoing, in the manufacture of high octane motor fuel by the alkylation of isobutane with propylene, alkylation conditions that favor the production of triptane obviously are preferable. Further, since neohexane which may be produced by the alkylation of isobutane with ethylene, has an otcane number of 93.4, and since 2,3-dimethylpentane and 2,4-dimethylpentane which are the predominant constituents of the alkylate obtained in the alkylation of isobutane with propylene in the presence of heterogeneous alkylation catalysts, have octane numbers of 84 and 82, respectively, the importance of the alkylation of isobutane with propylene in the presence of homogeneous gaseous phase alkylation catalysts under alkylation conditions that favor the production of triptane is manifest. It was also found that in actual practice, it was impossible to obtain triptane exclusively, appreciable amounts of 2,2-dimethylpentane and 2-methylhexane being always formed.

The specific classes of homogeneous gaseous phase catalysts claimed in the above-noted copending applications are organic halides, and, more particularly, organic chlorides and organic bromides.

In still another copending application, Serial Number 502,812, filed September 17, 1943, in which the inventor of the present application is also coinventor, it was found that elemental halogens, particularly chlorine and bromine, are suitable homogeneous gaseous phase alkylation catalysts and that isoparaffinic and normal paraffinic hydrocarbons may be efficiently alkylated with olefinic hydrocarbons to produce high yields of high octane gasoline by using small or promoter amounts of elemental halogens to form with the hydrocarbon reactants, a single homogeneous gaseous phase during the alkylation operation.

I have now found that the alkylation catalytic activity of homogeneous gaseous phase alkylation catalysts such as elemental halogens and organic halides, may be promoted through the use of gaseous oxidizing agents during the gaseous phase catalytic alkylation operation.

It is an object of the present invention to provide an improved process for alkylating isoparaffinic or normal paraffinic hydrocarbons with olefinic hydrocarbons in the presence of elemental halogens or organic halides as homogeneous gaseous phase alkylation catalysts. Another object of the present invention is to provide an improved process for alkylating isoparaffinic hydrocarbons with olefinic hydrocarbons in the presence of elemental halogens or organic halides as homogeneous gaseous phase alkylation catalysts, to produce high yields of high octane gasoline. A more specific object is to provide a process for promoting the alkylation catalytic activity of organic halides or of elemental halogens during the gaseous phase catalytic alkylation of isobutane with propylene to produce high yields of high octane gasoline. A very important object of the present invention is to afford a process capable of carrying out the above objects by using small amounts of gaseous oxidizing agents that form with the hydrocarbon reactants and in the organic halides or elemental halogens, a single, homogeneous gaseous phase during the alkylation operation. Other objects and advantages of the present invention will become apparent to those skilled in the art from the following description.

Broadly stated, my invention provides a process for alkylating normal paraffinic or isoparaffinic hydrocarbons, particularly isobutane, with olefinic hydrocarbons, particularly ethylene, propylene, and butylene, which comprises contacting the paraffinic and olefinic hydrocarbons in gaseous phase and in a reaction zone under alkylating conditions, with small amounts of an alkylation catalyst consisting essentially of elemental halogens, particularly chlorine and bromine, or of organic halides, particularly organic chlorides and bromides, that form with the hydrocarbon reactants, a single, homogeneous gaseous phase under the alkylation conditions of the reaction zone, in the presence of small amounts of a gaseous oxidizing agent.

An important feature of the process of the present invention is the fact that, contrary to the known catalytic alkylation processes of the prior art which are only capable of alkylating isoparaffinic hydrocarbons, our process is capable of alkylating either normal paraffinic or isoparaffinic hydrocarbons with substantially equal ease.

Another important feature of the process of the present invention is the relatively low temperature that may be used. As a result, degradation of the hydrocarbon reactants in the charge to low molecular weight hydrocarbons and the pronounced occurrence of side reactions including polymerization of the olefinic hydrocarbons are substantially avoided. Consequently, in my process, I obtain high yields of a high grade product that is almost entirely paraffinic in nature and is substantially free from impurities.

A very important feature of the present invention is the fact that, contrary to known catalytic alkylation processes of the prior art in which the hydrocarbon reactants being processed form with the alkylation catalysts, a heterogeneous system during the alkylation operation, the alkylation process of my invention employs alkylation catalysts consisting essentially of materials that form with the hydrocarbon reactants being processed, a single, homogeneous gaseous phase under alkylating conditions. The alkylation catalysts of the present invention are called, therefore and as noted hereinbefore, homogeneous gaseous phase alkylation catalysts, in contradistinction to the alkylation catalysts of the prior art which are referred to as heterogeneous alkylation catalysts. Accordingly, as a result of the catalysts being in the same phase or state as the hydrocarbon reactants being processed, fouling of the catalyst is substantially eliminated and agitation and/or mixing problems are non-extant. Further, since the catalytic activity of alkylation catalysts appears to be predicated somewhat upon contact between the catalysts and the hydrocarbon reactants at the interfaces therebetween, it follows that the catalytic efficiency of a given catalyst increases with the increase in area of interfacial contact, other variables remaining constant. Hence, since the homogeneous gaseous phase alkylation catalysts of my process inherently furnish the greatest possible "interfacial contact" between the catalyst and the hydrocarbon reactants under the conditions of alkylation, efficient catalytic activity with a concomitant high yield of high grade alkylate is achieved using relatively small amounts of homogeneous gaseous phase alkylation catalyst.

In view of the foregoing, an operation feature of the process of the present invention that is of considerable practical importance is that small or promoter amounts of organic halides or of elemental halogens are used as alkylation catalysts. These amounts are so small that they may be discarded feasibly, thereby obviating recovery and regeneration problems and eliminating high initial and operation costs.

As disclosed in application Serial Number 502,813, filed September 17, 1943, and in application Serial Number 502,812, filed September 17, 1943, a most important feature of homogeneous gaseous phase alkylation is that high yields of high octane motor fuel are obtained by alkylating isobutane with propylene in the presence of organic halides or elemental halogens, particularly, organic chlorides and organic bromides and chlorine and bromine. In the alkylation of isobutane with propylene, organic bromides and bromine are the preferred catalysts. It was found that when bromine or an organic bromide is used as the homogeneous gaseous phase alkylation catalyst in the alkylation of isobutane with propylene, the alkylate contains an appreciably larger proportion of the triptane- and 2,2-dimethylpentane-containing fraction, than the alkylate obtained when other organic halides or other halogens are employed. However when an organic bromide or bromine is used, the concentration of the triptane in the triptane- and 2,2-dimethylpentane-containing fraction is always lower than that obtained when other organic halides or other halogens are employed. The higher yield of 2,2-dimethylpentane thus obtained, is accompanied by a decrease in the 2-methylhexane. Therefore, since it thus appears that organic bromides and bromine favor the first and second alkylation reactions referred to hereinbefore; while organic chlorides and chlorine favor the first and third alkylation reactions referred to; and since the first and second alkylation reactions referred to, produce products that have the highest and higher octane numbers, respectively, the advantages of employing an organic bromide or bromine as the homogeneous gaseous phase alkylation catalyst for the manufacture of high octane motor fuel by my process are manifest. By way of illustrative example, it is possible to obtain a fraction containing 10 parts of triptane, 85 parts of 2,2-dimethylpentane and only 5 parts of 2-methylhexane. This fraction is considerably larger per pass when an organic bromide or bromine is used as the catalyst, than when chlorine or an organic chloride is employed. The overall per pass yield of 2,2-dimethylpentane is increased appreciably. Therefore, even though the yield of triptane is only slightly increased, it still seems favorable to produce 80 octane 2,2-dimethylpentane at the expense of 45 octane 2-methylhexane.

The amount of organic halide or of elemental halogen used in my process varies between about 0.5% and about 3%, and preferably between about 1% and about 1.25%, with respect to the total charge of hydrocarbon reactants. It must be noted, however, that larger amounts of organic halide or of elemental halogen may be employed if desired, although no additional advantages result therefrom.

As disclosed in application Serial Number 502,018, filed September 11, 1943, the organic halides that are used as homogeneous gaseous phase alkylation catalysts, may be solids, liquids or gases under normal conditions. However, it is likewise essential for the purposes of my process, that the organic halides and the elemental halogens form with the hydrocarbon reactants being processed, a single, homogeneous gaseous phase under the alkylation conditions of the process. The organic halide catalysts comprise halogen derivatives of hydrocarbons, wherein halogens have been substituted for part or all the hydrogen of an organic compound. Chlorinated naphtha, chloroform, carbon tetrachloride, 1,2,3-trichloropropane, benzyl chloride, propylene tribromide, propylene dibromide, ethyl bromide may be mentioned by way of non-limiting examples of organic halides suitable for use as homogeneous gaseous phase alkylation catalysts. It is understood, of course, that hydrogen halides, reacting with hydrocarbons, can be used to form the organic halide catalysts in situ.

In accordance with the present invention, the promoters for the homogeneous gaseous phase alkylation catalysts, organic halides and elemental halogens, are oxidizing agents which may be solids, liquids or gases under normal conditions. However, it is also essential for the purposes of my process, that these oxidizing agents form with the hydrocarbon reactants being processed, and with the organic halides or elemental halogens, a single, homogeneous gaseous phase under the alkylation conditions of the process. Oxygen or oxygen-containing gases, sulfur oxides, nitrogen oxides, and so forth, have been found to be very effective promoters of this type.

The amount of promoter used in my process varies between about 0.1% and about 2.0%, and preferably between about 0.5% and about 1.25%, with respect to the total charge of hydrocarbon reactants. It must noted, however, that larger amounts of oxidizing agents may be employed if desired, although no additional advantages result therefrom.

The paraffinic and olefinic hydrocarbons to be used in my process may be derived from any suitable source, as is well known in the art, and may be used either in the pure state or in admixture with other constituents not undesirable. The paraffinic and olefinic hydrocarbons usually employed in the preferred operation of manufacturing motor fuels, will be the normally gaseous paraffinic hydrocarbons, except methane and ethane, and the normally gaseous olefinic hydrocarbons, as is well understood in the art. Here again this process has a distinct advantage over many of the prior art processes, in that the olefin ethylene may be used for alkylating the paraffinic hydrocarbons. It is well known that ethylene cannot be used in many catalytic processes, including the sulfuric acid process, whereby the supply of available olefinic hydrocarbons is restricted. Therefore, an important aspect of the present invention is the fact that butane, for instance, may be alkylated with ethylene.

A conventional and preferred source of paraffinic and olefinic hydrocarbons is the fixed gases obtained around petroleum refineries. These fixed gases may furnish substantially all the desired paraffinic and olefinic hydrocarbons, or it may be necessary or desirable to obtain additional supplies, as is well understood. Additional olefinic hydrocarbons, if required, may be formed from a portion of the paraffinic hydrocarbons. On the other hand, additional paraffinic hydrocarbons may be admixed to increase the concentration of paraffinic hydrocarbons to a desired magnitude.

In carrying out my process, I use temperatures varying between about 590° F. and about 850° F., and preferably temperatures varying between about 650° F. and about 825° F. In the alkylation of isobutane with propylene, however, it was found, as disclosed in copending application Serial Number 502,813, filed September 17, 1943, that the best yields of desired alkylate are obtained when the alkylation is conducted at temperatures falling within about 750° F. to about 850° F., and preferably, about 775° F. to about 825° F.

The alkylate produced under these conditions contains no more than 5% of olefinic hydrocarbons and no aromatics so that the predominance of alkylation obtained thereby is a distinct feature of the process. Under appreciably higher temperature conditions, side reactions occur that substantially reduce the purity of the product obtained. In the alkylation of isobutane with propylene in accordance with the process of the present invention, it must be noted that even within the preferred temperature range, side reactions occur that account for substantial portions of the total alkylate, but a fraction boiling at 79° C. to 82° C. and consisting of 15 parts of triptane to 85 parts of 2,2-dimethylpentane may be obtained.

The pressure to be used in my process may vary from about 500 pounds per square inch to about 6000 pounds per square inch or more, and preferably from about 2500 pounds per square inch to about 6000 pounds per square inch for the alkylation of isobutane with propylene, the most suitable pressure being more or less dependent upon the particular temperature involved. In general, the higher the pressure, the higher the yield of alkylate. Accordingly, the criterion for establishing an upper limit to the pressure range used is primarily the feasibility of maintaining such pressure.

In my process it is desirable, as in known isoparaffin-olefin alkylation processes, to keep the concentration of the olefinic hydrocarbons relatively low during the alkylation reaction, in order to eliminate as much olefin polymerization as possible. Accordingly, it is advisable to maintain the olefin concentration in the charge below about 25% by volume, and preferably between about 7% and about 12% by volume.

The alkylate product that I obtain distills over a fairly large boiling range, but a greater part of the alkylate, usually from about 85% to about 90%, distills in the boiling range of aviation gasolines. The iodine number of the aviation distillate is low, on the order of about 5 to 10. As mentioned hereinabove, the alkylate product consists predominantly of branched paraffinic hydrocarbons.

Numerous experimental data could be adduced to indicate the results obtainable by employing the promoters of the present invention in the homogeneous gaseous phase alkylation in the presence of organic halides or of elemental halogens, but the following examples are sufficiently characteristic:

|  | Run 1 | Run 2 | Run 3 | Run 4 |
|---|---|---|---|---|
| Isobutane_____grams | 625 | 625 | 625 | 625 |
| Propylene_____do___ | 75 | 75 | 75 | 75 |
| Catalyst_____ | (1) | (1) | (1) | (1) |
| Wt. of catalyst_____grams__ | 10 | 10 | 10 | 20 |
| Promoter_____ | None | (2) | (2) | (2) |
| Wt. of promoter_____grams__ | ------ | 0.5 | 2.3 | 2.3 |
| Temperature, ° F_____ | 775 | 775 | 775 | 775 |
| Pressure, lbs./sq. in_____ | 3,800 | 3,800 | 3,800 | 3,800 |
| Yield of alkylate based on propylene_____percent__ | 100 | 126 | 170 | 168 |

1 1,2,3-trichloro-propane.
2 Air.

The alkylate produced by my process is contaminated by various halogen compounds which are present in small concentration. These compounds cause a negative susceptibility to tetraethyl lead, and therefore should be removed. Removal of the halogen compounds is possible in a variety of ways, as set forth in copending applications Serial Number 477,450, filed February 27, 1943; Serial Number 502,504, filed September 15, 1943; and Serial Number 504,436, filed September 30, 1943.

The present invention may be embodied in other specific forms without departing from the spirit or essential attributes thereof, and it is therefore desired that the present embodiments be considered in all respects as illustrative and not restrictive, reference being had to the appended claims rather than to the foregoing description to indicate the scope of the invention.

I claim:

1. A process for manufacturing triptane which comprises contacting isobutane and propylene in gaseous phase and in a reaction zone under alkylating conditions including temperatures varying between about 775° F. and about 825° F. and pressures in excess of 2500 pounds per square inch, with a homogeneous gaseous phase alkylation catalyst consisting essentially of a bromine derivative of a light aliphatic hydrocarbon, in the presence of oxygen, and maintaining said isobutane in excess over said propylene in said reaction zone so that alkylation is the principal reaction.

2. In a process of manufacturing high octane gasoline by alkylating a normally gaseous paraffinic hydrocarbon with a normally gaseous olefinic hydrocarbon in a reaction zone under alkylating conditions and in the presence of catalytic material; the improvement which comprises contacting said normally gaseous paraffinic hydrocarbon and said normally gaseous olefinic hydrocarbon in gaseous phase and in a reaction zone under alkylating conditions including temperatures varying between about 590° F. and about 850° F. and pressures in excess of 500 pounds per square inch, with a homogeneous gaseous phase alkylation catalyst consisting essentially of chlorine, in the presence of oxygen, and maintaining said normally gaseous paraffinic hydrocarbon in excess over said normally gaseous olefinic hydrocarbon in said reaction zone so that alkylation is the principal reaction.

3. A process for manufacturing high octane gasoline, which comprises contacting isobutane and propylene in gaseous phase and in a reaction zone under alkylating conditions including temperatures varying between about 750° F. and about 850° F. and pressures in excess of 2500 pounds per square inch, with a homogeneous gaseous phase alkylation catalyst consisting essentially of chlorine, in the presence of oxygen, and maintaining said isobutane in excess over said propylene in said reaction zone so that alkylation is the principal reaction.

4. In a process of alkylating a paraffinic hydrocarbon with an olefinic hydrocarbon in a reaction zone under alkylating conditions and in the presence of catalytic material; the improvement which comprises contacting said paraffinic hydrocarbon and said olefinic hydrocarbon in gaseous phase and in a reaction zone under alkylating conditions, with a homogeneous gaseous phase alkylation catalyst consisting essentially of a bromine derivative of a light aliphatic hydrocarbon, in the presence of oxygen, and maintaining said paraffinic hydrocarbon in excess over said olefinic hydrocarbon in said reaction zone so that alkylation is the principal reaction.

5. A process for manufacturing triptane, which comprises contacting isobutane and propylene in gaseous phase and in a reaction zone under alkylating conditions including temperatures varying between about 775° F. and about 825° F. and pressures in excess of 2500 pounds per square inch, with a homogeneous gaseous phase alkylation catalyst consisting essentially of material selected from the group consisting of chlorine derivatives of hydrocarbons, bromine derivatives of hydrocarbons, chlorine and bromine, in the presence of oxygen, and maintaining said isobutane in excess over said propylene in said reaction zone so that alkylation is the principal reaction.

6. A process for manufacturing triptane which comprises contacting isobutane and propylene in gaseous phase and in a reaction zone under alkylating conditions including temperatures varying between about 775° F. and about 825° F. and pressures in excess of 2500 pounds per square inch, with a homogeneous gaseous phase alkylation catalyst consisting essentially of a chlorine derivative of a light aliphatic hydrocarbon, in the presence of oxygen, and maintaining said isobutane in excess over said propylene in said reaction zone so that alkylation is the principal reaction.

7. In a process of manufacturing high octane gasoline by alkylating a normally gaseous paraffinic hydrocarbon with a normally gaseous olefinic hydrocarbon in a reaction zone under alkylating conditions and in the presence of catalytic material; the improvement which comprises contacting said normally gaseous paraffinic hydrocarbon and said normally gaseous olefinic hydrocarbon in gaseous phase and in a reaction zone under alkylating conditions including temperatures varying between about 590° F. and about 850° F. and pressures in excess of 500 pounds per square inch, with a homogeneous gaseous phase alkylation catalyst consisting essentially of a bromine derivative of a light aliphatic hydrocarbon, in the presence of oxygen, and maintaining said normally gaseous paraffinic hydrocarbon in excess over said normally gaseous olefinic hydrocarbon in said reaction zone so that alkylation is the principal reaction.

8. A process of manufacturing triptane which comprises contacting isobutane and propylene in gaseous phase and in a reaction zone under alkylating conditions including temperatures varying between about 775° F. and about 825° F. and pressures in excess of 2500 pounds per square inch, with homogeneous gaseous phase alkylation catalyst consisting essentially of chlorine, in the presence of oxygen, and maintaining said isobutane in excess over said propylene in said reaction zone so that alkylation is the principal reaction.

9. In a process of alkylating a paraffinic hydrocarbon with an olefinic hydrocarbon in a reaction zone under alkylating conditions and in the presence of catalytic material; the improvement which comprises contacting said paraffinic hydrocarbon and said olefinic hydrocarbon in gaseous phase and in a reaction zone under alkylating conditions including temperatures varying between about 590° F. and about 850° F. and pressures in excess of 500 pounds per square inch, with a homogeneous gaseous phase alkylation catalyst consisting essentially of a chlorine derivative of a light aliphatic hydrocarbon, in the presence of oxygen, and maintaining said paraffinic hydrocarbon in excess over said olefinic hydrocarbon in said reaction zone so that alkylation is the principal reaction.

10. In a process of manufacturing high octane gasoline by alkylating a normally gaseous paraffinic hydrocarbon with a normally gaseous olefinic hydrocarbon in a reaction zone under alkylating conditons and in the presence of catalytic material; the improvement which comprises contacting said normally gaseous paraffinic hydrocarbon and said normally gaseous olefinic hydrocarbon in gaseous phase and in a reaction zone under alkylating conditions including temperatures varying between about 650° F. and about 825° F. and pressures in excess of 1500 pounds per square inch, with a homogeneous gaseous phase alkylation catalyst consisting essentially of a chlorine derivative of a light aliphatic hydrocarbon, in the presence of oxygen, and maintaining said normally gaseous paraffinic hydrocarbon in excess over said normally gaseous olefinic hydrocarbon in said reaction zone so that alkylation is the principal reaction.

11. In a process of alkylating isobutane with propylene in a reaction zone under alkylating conditions and in the presence of catalytic material; the improvement which comprises contacting said isobutane and said propylene in gaseous phase and in a reaction zone under alkylating conditions including temperatures varying between about 750° F. and about 850° F. and pressures in excess of 2500 pounds per square inch, with a homogeneous gaseous phase alkylation catalyst consisting essentially of a bromine derivative of a light aliphatic hydrocarbon, in the presence of oxygen, and maintaining said isobutane in excess over said propylene in said reaction zone so that alkylation is the principal reaction.

12. A process for alkylating a normally gaseous paraffinic hydrocarbon with a normally gaseous olefinic hydrocarbon, which comprises contacting said normally gaseous paraffinic hydrocarbon and said normally gaseous olefinic hydrocarbon in gaseous phase and in a reaction zone under alkylating conditions including temperatures varying between about 590° F. and about 850° F. and pressures in excess of 500 pounds per square inch, with a homogeneous gaseous phase alkylation catalyst consisting essentially of material selected from the group consisting of chlorine derivatives of hydrocarbons, bromine derivatives of hydrocarbons, chlorine and bromine, in the presence of oxygen, and maintaining said normally gaseous paraffinic hydrocarbon in excess over said normally gaseous olefinic hydrocarbon in said reaction zone so that alkylation is the principal reaction.

13. A process for manufacturing high octane gasoline which comprises contacting isobutane and propylene in gaseous phase and in a reaction zone under alkylating conditions including temperatures varying between about 750° F. and about 850° F. and pressures in excess of 2500 pounds per square inch, with a homogeneous gaseous phase alkylation catalyst consisting essentially of a chlorine derivative of a light aliphatic hydrocarbon, in the presence of oxygen, and maintaining said isobutane in excess over said propylene in said reaction zone so that alkylation is the principal reaction.

14. In a process of alkylating a paraffinic hydrocarbon with an olefinic hydrocarbon in a reaction zone under alkylating conditions and in the presence of catalytic material; the improvement which comprises contacting said paraffinic hydrocarbon and said olefinic hydrocarbon in gaseous phase and in a reaction zone under alkylating conditions, with a homogeneous gaseous phase alkylation catalyst consisting essentially of material selected from the group consisting of chlorine derivatives of hydrocarbons, bromine derivatives of hydrocarbons, chlorine and bromine, in the presence of oxygen, and maintaining said paraffinic hydrocarbon in excess over said olefinic hydrocarbon in said reaction zone so that alkylation is the principal reaction.

15. In a process of alkylating isobutane with propylene in a reaction zone under alkylating conditions and in the presence of catalytic material; the improvement which comprises contacting said isobutane and said propylene in gaseous phase and in a reaction zone under alkylating conditions including temperatures varying between about 750° F. and about 850° F. and pressures in excess of 2500 pounds per square inch, with a homogeneous gaseous phase alkylation catalyst consisting essentially of material selected from the group consisting of chlorine derivatives of hydrocarbons, bromine derivatives of hydrocarbons, chlorine and bromine, in the presence of oxygen, and maintaining said isobutane in excess over said propylene in said reaction zone so that alkylation is the principal reaction.

16. In a process of alkylating a paraffinic hydrocarbon with an olefinic hydrocarbon in a reaction zone under alkylating conditions and in the presence of catalytic material; the improvement which comprises contacting said paraffinic hydrocarbon and said olefinic hydrocarbon in gaseous phase and in a reaction zone under alkylating conditions, with a homogeneous gaseous phase alkylation catalyst consisting essentially of chlorine, in the presence of oxygen, and maintaining said paraffinic hydrocarbon in excess over said olefinic hydrocarbon in said reaction zone so that alkylation is the principal reaction.

AARON W. HORTON.